US010141085B2

(12) United States Patent
Wallenius et al.

(10) Patent No.: US 10,141,085 B2
(45) Date of Patent: Nov. 27, 2018

(54) CONDUCTOR JOINT AND CONDUCTOR JOINT COMPONENT

(71) Applicant: Wicetec Oy, Helsinki (FI)

(72) Inventors: Tomas Wallenius, Vantaa (FI); Pauli Vuomajoki, Rovaniemi (FI)

(*) Notice: Subject to any disclaimer, the term of this patent is extended or adjusted under 35 U.S.C. 154(b) by 405 days.

(21) Appl. No.: 14/956,420

(22) Filed: Dec. 2, 2015

(65) Prior Publication Data

US 2016/0163415 A1  Jun. 9, 2016

(30) Foreign Application Priority Data

Dec. 4, 2014 (FI) ...................................... 20144258

(51) Int. Cl.
*H01B 5/02* (2006.01)
*H01R 4/58* (2006.01)
(Continued)

(52) U.S. Cl.
CPC ............... *H01B 5/02* (2013.01); *F03D 80/40* (2016.05); *H01B 1/02* (2013.01); *H01R 4/58* (2013.01);
(Continued)

(58) Field of Classification Search
CPC . H05B 3/34; H05B 3/03; H05B 3/145; H05B 2203/011; H05B 3/342;
(Continued)

(56) References Cited

U.S. PATENT DOCUMENTS 3,864,160 A * 2/1975 Davidoff ................. D06Q 1/04
219/549
4,115,917 A * 9/1978 Charon ................. H05B 3/145
156/291
(Continued)

FOREIGN PATENT DOCUMENTS

CN 202055460 U 11/2011
CN 203240642 U 10/2013
(Continued)

OTHER PUBLICATIONS

Extended European search report dated Jul. 8, 2016 issued by European Patent Office.
(Continued)

*Primary Examiner* — Eric Stapleton
(74) *Attorney, Agent, or Firm* — Berggren LLP

(57) ABSTRACT

A conductor joint for joining a copper conductor to a fiber-structured heating element whose dimensions are length (L)>>width (W)>>thickness (T), and which heating element comprises carbon fiber strands, wherein the copper conductor is transversely disposed to the longitudinal direction (L) of the heating element to form a layered structure in the thickness direction (T), on both sides of the heating element, the copper conductor comprising strands separable from each other. The strands of the copper conductor, the number and diameter of which are suitable for transferring a power of more than ten kW, are quantitatively substantially evenly distributed on both sides of the heating element, the strands are disposed in a planar manner in such a way that
(Continued)

the strands substantially lie in one plane, adjacent to each other, and the ends of the strands extend, in the width direction (W) of the heating element, beyond the heating element, wherein the portions of the ends of the strands extending beyond the heating element overlap each other, and an electric joint is formed between the lateral faces of these overlapping strands.

11 Claims, 1 Drawing Sheet

(51) Int. Cl.
  *H01B 1/02*     (2006.01)
  *H05B 3/03*     (2006.01)
  *H05B 3/14*     (2006.01)
  *H05B 1/00*     (2006.01)
  *H05B 3/34*     (2006.01)
  *F03D 80/40*    (2016.01)
  *F03D 80/30*    (2016.01)

(52) U.S. Cl.
  CPC .............. *H05B 3/03* (2013.01); *H05B 3/145* (2013.01); *H05B 3/34* (2013.01); *F03D 80/30* (2016.05); *H05B 2203/011* (2013.01); *Y02E 10/72* (2013.01)

(58) Field of Classification Search
  CPC ........ H05B 2203/005; H05B 2203/014; H05B 2203/017; H05B 2203/029; H01R 4/58; B60N 2/5685; H01B 1/02; H01B 5/02
  USPC .................................................. 219/217, 541
  See application file for complete search history.

(56) References Cited

U.S. PATENT DOCUMENTS

| | | | | | |
|---|---|---|---|---|---|
| 4,301,356 | A * | 11/1981 | Tanei | ........................ | E04C 5/07 106/672 |
| 4,385,957 | A * | 5/1983 | Wackerle | ............ | B29C 35/0272 156/273.9 |
| 4,434,023 | A * | 2/1984 | Kanamori | ............. | B29C 70/081 156/307.3 |
| 4,534,886 | A * | 8/1985 | Kraus | ................... | B29C 70/504 252/502 |
| 4,538,054 | A * | 8/1985 | de la Bretoniere | ...... | D02G 3/12 219/545 |
| 4,581,522 | A * | 4/1986 | Graham | .............. | F24D 19/1096 219/213 |
| 4,591,701 | A * | 5/1986 | Tokumaru | .............. | H05B 3/141 219/541 |
| 4,960,979 | A * | 10/1990 | Nishimura | ............. | H05B 3/145 219/549 |
| 4,990,755 | A * | 2/1991 | Nishimura | ............. | H05B 3/146 219/549 |
| 5,344,696 | A * | 9/1994 | Hastings | ................... | B32B 7/02 428/220 |
| 5,459,327 | A * | 10/1995 | Nomura | ................... | B32B 29/00 250/504 R |
| 5,503,887 | A * | 4/1996 | Diaz | ..................... | B29C 70/882 156/152 |
| 5,582,757 | A * | 12/1996 | Kio | ......................... | H05B 3/145 219/212 |
| 5,824,996 | A * | 10/1998 | Kochman | ........... | A41D 13/0051 219/529 |
| 5,925,275 | A * | 7/1999 | Lawson | ................. | B64D 15/12 219/543 |
| 6,057,530 | A * | 5/2000 | Gurevich | ........... | A41D 13/0051 219/529 |
| 6,057,532 | A * | 5/2000 | Dexter | ................. | H05B 3/0076 219/553 |
| 6,145,787 | A * | 11/2000 | Rolls | ..................... | B64D 15/12 219/545 |
| 6,172,344 | B1 * | 1/2001 | Gordon | .................... | H05B 3/34 219/497 |
| 6,229,123 | B1 * | 5/2001 | Kochman | .......... | A41D 13/0051 219/529 |
| 6,452,138 | B1 * | 9/2002 | Kochman | .......... | A41D 13/0051 219/529 |
| 6,475,935 | B1 * | 11/2002 | Ishizaki | ................... | C09K 5/14 442/187 |
| 6,710,313 | B1 * | 3/2004 | Asami | ..................... | A47C 7/748 219/212 |
| 6,957,525 | B2 * | 10/2005 | Verstraeten | ............ | D02G 3/441 57/238 |
| 6,977,360 | B2 * | 12/2005 | Weiss | ..................... | H05B 3/345 219/211 |
| 6,998,576 | B2 * | 2/2006 | Marquis | ............... | A01K 87/085 219/204 |
| 7,041,943 | B2 * | 5/2006 | Michelmann | ........... | H05B 3/12 219/204 |
| 7,053,344 | B1 * | 5/2006 | Surjan | ..................... | H05B 3/34 219/217 |
| 7,064,299 | B2 * | 6/2006 | Green | ................... | H05B 3/347 219/515 |
| 7,173,223 | B2 * | 2/2007 | Kuo | ...................... | H05B 3/347 219/528 |
| 7,268,325 | B1 * | 9/2007 | Chuang | ................... | H01C 3/12 219/202 |
| 7,705,271 | B2 * | 4/2010 | Hilmer | ................. | B60N 2/5685 219/202 |
| 7,994,080 | B2 * | 8/2011 | Theor | ...................... | D04H 1/46 428/369 |
| 8,502,077 | B2 * | 8/2013 | Kay | ....................... | F42D 1/043 102/202.5 |
| 8,866,048 | B2 * | 10/2014 | Sun | ......................... | B32B 37/06 219/213 |
| 8,872,072 | B2 * | 10/2014 | Yoshida | ............. | G03G 15/2057 219/216 |
| 9,093,194 | B2 * | 7/2015 | McCullough | ............ | H01B 7/14 |
| 9,324,472 | B2 * | 4/2016 | Lee | ........................ | D06M 11/83 |
| 9,439,244 | B2 * | 9/2016 | Verstraeten | ............ | H05B 3/342 |
| 2001/0027973 | A1 * | 10/2001 | Michelmann | .......... | D04B 21/16 219/529 |
| 2001/0030182 | A1 * | 10/2001 | Haag | ...................... | B62D 1/065 219/204 |
| 2002/0040900 | A1 * | 4/2002 | Arx | ....................... | A47J 36/2483 219/544 |
| 2002/0117495 | A1 * | 8/2002 | Kochman | ................ | H05B 3/34 219/549 |
| 2002/0153368 | A1 * | 10/2002 | Gardner | .................. | B29C 70/82 219/545 |
| 2003/0189037 | A1 * | 10/2003 | Kochman | ............. | H05B 3/342 219/549 |
| 2003/0218003 | A1 * | 11/2003 | Ellis | ......................... | A61F 7/00 219/528 |
| 2004/0036325 | A1 * | 2/2004 | Diemer | ................. | H05B 3/146 297/180.12 |
| 2004/0065659 | A1 * | 4/2004 | Tse | ......................... | H05B 3/145 219/529 |
| 2004/0149711 | A1 * | 8/2004 | Wyatt | ...................... | A61F 7/00 219/217 |
| 2005/0051538 | A1 * | 3/2005 | Guckert | ................. | F28F 21/02 219/544 |
| 2005/0061801 | A1 * | 3/2005 | Kuo | ....................... | H05B 3/347 219/529 |
| 2005/0096574 | A1 * | 5/2005 | Wibaux | ................. | H05B 3/342 602/2 |
| 2005/0205551 | A1 * | 9/2005 | Aisenbrey | ........... | B29C 45/0013 219/549 |
| 2005/0225128 | A1 * | 10/2005 | Diemer | .................. | B60N 2/002 297/180.12 |
| 2006/0027552 | A1 * | 2/2006 | Krobok | .................... | H05B 3/34 219/217 |
| 2006/0084332 | A1 * | 4/2006 | Muschelknautz | ..... | F16L 59/029 442/6 |

(56) References Cited

U.S. PATENT DOCUMENTS

| | | | |
|---|---|---|---|
| 2006/0091133 A1* | 5/2006 | DiPucchio | H05B 3/342 219/545 |
| 2006/0118538 A1* | 6/2006 | Jones | B62D 1/065 219/204 |
| 2006/0278631 A1* | 12/2006 | Lee | H05B 3/342 219/529 |
| 2007/0056957 A1* | 3/2007 | Diemer | B60N 2/5685 219/549 |
| 2007/0188007 A1* | 8/2007 | Lazanja | B60N 2/5635 297/452.42 |
| 2007/0210074 A1* | 9/2007 | Maurer | B60N 2/5685 219/549 |
| 2007/0278210 A1* | 12/2007 | Weiss | B60N 2/5685 219/508 |
| 2007/0278214 A1* | 12/2007 | Weiss | H05B 3/342 219/545 |
| 2008/0073130 A1* | 3/2008 | Bulgajewski | H05B 3/34 177/136 |
| 2008/0099458 A1* | 5/2008 | Hilmer | B60N 2/5685 219/217 |
| 2008/0135120 A1* | 6/2008 | Seo | H05B 3/12 139/35 |
| 2008/0170982 A1* | 7/2008 | Zhang | B82Y 10/00 423/447.3 |
| 2008/0210679 A1* | 9/2008 | Raidt | F24D 13/022 219/213 |
| 2008/0223844 A1* | 9/2008 | Cronn | A41D 13/0051 219/211 |
| 2008/0290080 A1* | 11/2008 | Weiss | H05B 1/0238 219/202 |
| 2009/0194524 A1* | 8/2009 | Kim | E21B 43/24 219/544 |
| 2009/0200285 A1* | 8/2009 | Raidt | F24D 13/022 219/213 |
| 2010/0025388 A1* | 2/2010 | Ono | A47C 7/748 219/217 |
| 2010/0044075 A1* | 2/2010 | Weiss | H01B 1/22 174/126.2 |
| 2010/0062667 A1* | 3/2010 | Pan | B32B 5/26 442/102 |
| 2010/0116808 A1* | 5/2010 | Wang | F24D 13/022 219/213 |
| 2010/0162912 A1* | 7/2010 | Kay | F42D 1/043 102/202.14 |
| 2010/0258334 A1* | 10/2010 | Akaike | B60N 2/5685 174/126.1 |
| 2010/0270069 A1* | 10/2010 | Shar | H01B 1/18 174/377 |
| 2011/0068098 A1* | 3/2011 | Li | H05B 3/146 219/542 |
| 2011/0074380 A1* | 3/2011 | Jeon | D03D 13/00 323/318 |
| 2011/0104571 A1* | 5/2011 | Zhamu | H01B 1/122 429/231.95 |
| 2012/0091112 A1* | 4/2012 | Wei | B60N 2/5685 219/202 |
| 2012/0125914 A1* | 5/2012 | Yue | H05B 3/34 219/548 |
| 2013/0064528 A1* | 3/2013 | Bigex | H05B 3/36 392/468 |
| 2013/0108250 A1* | 5/2013 | Bigex | F16L 55/00 392/468 |
| 2014/0014646 A1* | 1/2014 | Fukuyama | H05B 1/0238 219/537 |
| 2014/0076877 A1* | 3/2014 | Cheng | H05B 3/34 219/212 |
| 2014/0102760 A1* | 4/2014 | Nelson | B29C 70/523 174/126.2 |
| 2014/0197157 A1* | 7/2014 | Aizawa | H05B 3/34 219/553 |

FOREIGN PATENT DOCUMENTS

| | | |
|---|---|---|
| DE | 202013105219 U1 | 2/2015 |
| EP | 0720946 A1 | 7/1996 |
| EP | 2088056 A1 | 8/2009 |
| EP | 2736304 A1 | 5/2014 |
| WO | 2012164167 A1 | 12/2012 |

OTHER PUBLICATIONS

Finnish Patent and Registration Office, dated May 22, 2015, Search report for Finnish Utility Model application No. U20144258.

* cited by examiner

CONDUCTOR JOINT AND CONDUCTOR JOINT COMPONENT

PRIORITY

This application claims priority of the Finnish application number U20144258 filed on Dec. 4, 2014, the contents of which is incorporated herein by reference in its entirety.

FIELD OF INVENTION

The invention relates to a connecting piece for connecting a copper conductor to a carbon fiber heating element. More particularly, the invention relates to connecting a copper conductor to an anti-icing carbon fiber heating element in a wind turbine blade for electric heating. The invention is a conductor joint for joining a copper conductor to a fiber-structured heating element whose dimensions can be length>>width>>thickness, and which heating element comprises carbon fiber strands, wherein the copper conductor is transversely disposed to the longitudinal direction of the heating element to form a layered structure in the thickness direction, on both sides of the heating element, the copper conductor comprising strands separable from each other.

The invention is intended to be used in wind turbines where any ice-forming environmental conditions may, due to deteriorated blade aerodynamics, decrease the efficiency of the wind turbine. The present invention is intended for use in megawatt-class wind turbines typically requiring a power transfer efficiency of dozens of kilowatts, such as 25 to 45 kW, from the conductor joint. Further, the aerodynamic properties of the blade, that is the shape and rigidity thereof, must remain, despite the electric heating, within the manufacturing and design tolerances for the blade. This imposes special requirements on the conductor joint because the conductor joint must be very thin and unnoticeable shape but it still has to transmit quite a high electric power. In addition to the above-mentioned, the fact that the blades of a wind turbine are very likely to be struck by lightning, determines which kind of structure can be used. If a blade, or a heating element in the blade, is struck by lightning, a huge voltage and current peak, possibly running through the present conductor joint, is created. Because the conductor joint is very difficult to reach for service and reparation, the conductor joint must also be lightning-proof.

WO2012/164167A1 is known from the prior art, disclosing solutions for transferring an electric current to a heating element in a wind turbine blade. In particular, the embodiment described in FIG. 2b of the specification, and in the corresponding section of the description, has proven to be a technically successful solution. Therein, the heating element is a multilayered structure having an intermediate conductor.

SUMMARY OF THE INVENTION

An objective of the present invention is to improve the solution known from the prior art and to ensure a reliable transfer of a high electric power from a copper conductor to a carbon fiber heating element. A particular objective is to provide a solution where so-called hotspots can be avoided, i.e. points where the density of the current flow increases compared to the rest of the joint and which may start to become heated, possibly causing damage to the structure or making it weaker in some other way.

The conductor joint according to the invention is characterized in what is set forth in the characterizing part of the independent claim.

Hence, the invention is a conductor joint for joining a copper conductor to a fiber-structured heating element whose dimensions are length>>width>>thickness, and which heating element comprises carbon fiber strands, wherein the copper conductor is transversely disposed to the longitudinal direction of the heating element to form a layered structure in the thickness direction, on both sides of the heating element, the copper conductor comprising strands separable from each other. The strands of the copper conductor, the number and diameter of which typically are suitable for transferring a power of more than ten kW, are quantitatively substantially evenly distributed on both sides of the heating element, the strands are disposed in a planar manner in such a way that the strands substantially lie in one plane, adjacent to each other, and the ends of the strands extend, in the width direction of the heating element, beyond the heating element, wherein the portions of the ends of the strands extending beyond the heating element overlap each other, and an electric joint is formed between the lateral faces of these overlapping strands.

The above shows, by means of a conventional mathematical operator, that as for the dimensions of heating element, the length of the heating element typically is considerably greater than its width, which, in turn, is considerably greater than its thickness. As a practical example, the length, width and thickness of the heating element can vary from meters to dozens of meters, from ten centimeters to one meter and from less than millimeter to one millimeter, respectively. In some cases, the width and length can be approximately of the same magnitude, if heating only is needed locally in a small area.

In an embodiment, the heating element comprises carbon fiber strands, possibly intersecting each other, or, the heating element can be made of a unidirectional carbon fiber mat. The intersecting carbon fiber strands can be positioned, for example, at a 45° angle relative to the longitudinal direction, resulting in a very neutral behavior of the heating element with respect to the rest of the blade structure. That is, the heating element does not stiffen the blade structure. Overall, the type of the heating element used is of hardly any importance to the conductor joint. The solution is also applicable to other electrical heating elements having a lower conductivity than copper, wherein, because of the lower conductivity, the conductor joint is increased in area and is similar in shape as explained above.

A special feature of the invention is that it provides a low-profile conductor joint in the thickness direction of the structure. A particularly functional structure is obtained if the strand diameter of the copper conductor and the thickness of the heating element are 0.3 mm and 0.2 mm, respectively. The thickness of the layered structure is thus 2*0.3 mm+3*0.2 mm, 1.2 mm in total. Of course, the invention is not restricted to these dimensions but other dimensions are feasible. The number of strands needed is given by the following equation: $n=k*4*A/\pi d^2$ where A is the cross-sectional area of the copper conductor, determined by how high a current transfer capacity is required, based on the standards and regulations on electrical safety and installations, whereas k is a strand number constant based on experience on the number of strands needed, typically k=0.9-1.1.

The above-mentioned number of the copper conductor strands is quantitatively substantially evenly distributed on both sides of the heating element, the strands being disposed in a planar manner to substantially lie in one plane, adjacent to each other. Of course, when the strands are very abundant in number, the accuracy is not absolute but 45% of them can be disposed one side and 55% of them can be disposed on the other side, without any great consequences on the conductor joint. The planarity provides a maximum area between the strands of the copper conductor and the carbon fiber strands of the heating element. At the same time, any electric cross-currents caused by strands crossing over each other, possibly contributing to hotspots, are avoided. That is, strands crossing over each other cause a diminished conductive contacting area and a local accumulation of the current in very conductive spots, resulting in an undesired increased local current flow.

Further, the ends of the strands extend, in the width direction of the heating element, beyond the heating element, wherein the portions of the ends of the strands extending beyond the heating element overlap each other, and an electric joint is formed between the lateral faces of these overlapping strands. This maximizes the current transferred from the lateral faces of the strands of the copper conductor to the carbon fiber structure. Studies show that a current transferred from the end of a strand to a heating element is considerably more likely to create a hotspot there, i.e. the current is accumulated in the end region of the strand. When the strands of the copper conductor form a joint brought together outside the heating element, this portion aids, to a great extent, the current to pass from the strands of the copper conductor to the heating element, exactly in the desired manner. This is another feature providing a more steady current flow.

DETAILED DESCRIPTION OF THE INVENTION

Figure 1:
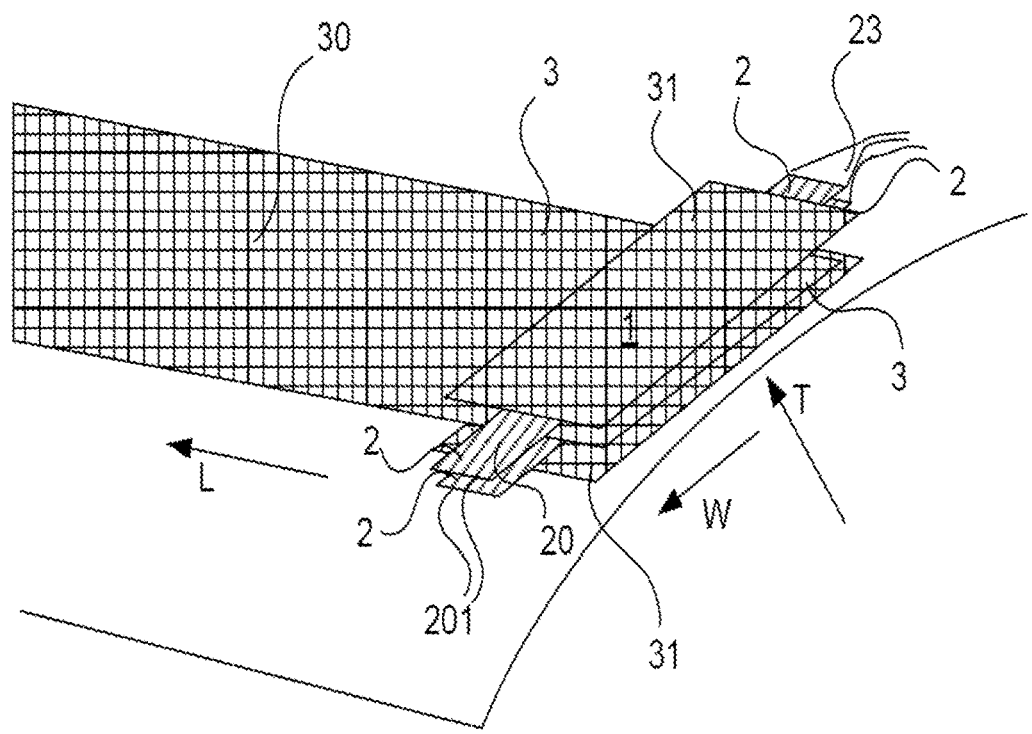
FIG. 1 shows an embodiment of the conductor joint.
Figure 2:
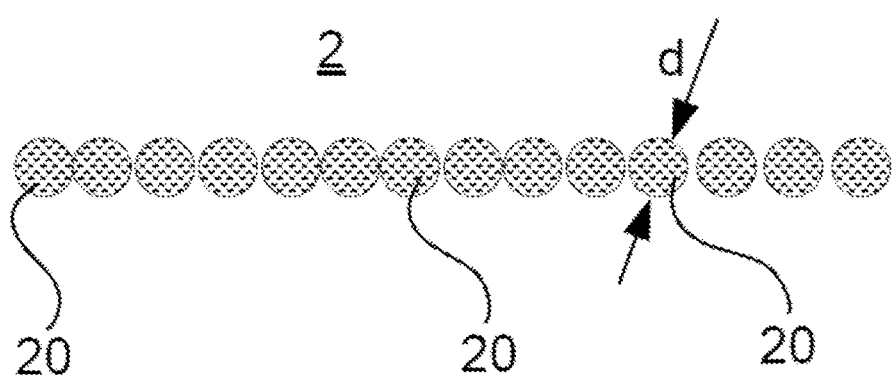
FIG. 2 shows a partial width of a copper conductor.

In the following, the invention will be explained in more detail with reference to the accompanying drawings wherein
FIG. 1 shows an embodiment of the conductor joint, and
FIG. 2 shows a partial width of a copper conductor.

FIG. 1 shows a conductor joint 1 for joining a copper conductor 2 to a fiber-structured heating element 3 whose dimensions are length L>>width W>>thickness T, and which heating element 3 comprises intersecting carbon fiber strands 30, wherein the copper conductor 2 is transversely disposed to the longitudinal direction L of the heating element 3 to form a layered structure in the thickness direction T, on both sides of the heating element 3, the copper conductor 2 comprising strands 20 separable from each other. The strands 20 of the copper conductor, the number and diameter of which are suitable for transferring a power of dozens kilowatts, such as 25-45 kW, are quantitatively substantially evenly distributed on both sides of the heating element 3, the strands 20 are disposed in a planar manner in such a way that the strands 20 substantially lie in one plane, adjacent to each other, and the ends 201 of the strands extend, in the width direction W of the heating element 3, beyond the heating element 3, wherein the portions of the ends 201 of the strands extending beyond the heating element 3 overlap each other, and an electric joint is formed between the lateral faces of these overlapping strands 20. In the inlet end of the copper conductor 2, the suitably spaced strands extending in one plane can be bundled up 23 and connected to a transmission cable by means of a conventional conductor joint (not shown). The layers are laminated or glued together during the manufacture, using a suitable method and materials. For a carbon fiber heating element, reinforced plastic construction methods, typically manual laminating and vacuum-bag curing, are used as the method. It is also possible to use other known laminating methods.

In an embodiment, the strands 20 of the copper conductor 2 extend, at the ends 201 of the strands, beyond the heating element by a distance, this distance being more than 10 times greater than the strand diameter d, preferably more than 30 times greater than the strand diameter. This ensures, up to the end of the edge of the heating element 3, that the electric current is evenly transferred from the copper conductor 2 to the heating element 3, throughout the entire width W of the heating element 3. Preferably, the proportions length>>width>>thickness also apply to the conductor joint, the orientation just is transverse to the longitudinal direction compared to the corresponding dimensions of the heating element.

The layered structure also comprises, on the side of the strands 20 of the copper conductor 2 facing away from the heating element 3 in the thickness direction T, a strip 31 of the heating element 3 adapted to equalize the electric potential between the heating element 3 and the copper conductor 2 as well as to increase the conductive area between the heating element and the copper conductor.

FIG. 2 is a view of an embodiment, or, more particularly, a part of the embodiment, across a short width of the copper conductor 2 and the strands 20 thereof. The figure is intended to illustrate how some of the strands 20 can be attached to each other while others of the strands can be slightly detached from each other. The strands preferably consist of a straight, unbraided and uninsulated copper wire in order to avoid a weakened contact caused by strand bending. The easiest way of obtaining a desired very conductive joint is to use straight strands. FIG. 2 shows the diameter d of one strand which preferably is approximately 0.3 mm. The number of strands needed is calculated by the following equation: $n = k*4*A/\pi d^2$ where A is the cross-sectional area of the copper conductor determined by how high a current transfer capacity is required. The strand number constant k is based on experience on the number of strands needed, typically k=0.9-1.1. Further, the magnitude of the current transfer capacity is chosen to allow an electric power of dozens of kilowatts, such as 30 kW, through the conductor joint, also resulting in a reliable ability to withstand most lightning strikes.

In an aspect of the invention, the invention also relates to a prefabricated conductor joint component for making a conductor joint according to the invention. Therein, the strands of the copper conductor are removably fixed to an auxiliary substrate, such as adhesive tape, on which the strands are disposed in a planar manner in such a way that the strands substantially extend in one plane only, adjacent to each other.

The invention may be described with the following examples:

EXAMPLE 1

A conductor joint for joining a copper conductor (2) to a fiber-structured heating element (3) whose dimensions are length (L)>>width (W)>>thickness (T), and which heating element (3) comprises carbon fiber strands (30), wherein the copper conductor (2) is transversely disposed to the longitudinal direction (L) of the heating element (3) to form a layered structure in the thickness direction (T), on both sides of the heating element (3), the copper conductor (2) comprising strands (20) separable from each other, characterized in that the strands (20) of the copper conductor (2), the number and diameter of which are suitable for transferring a power of more than ten kW, are quantitatively substantially evenly distributed on both sides of the heating element (3), the strands (20) are disposed in a planar manner in such a way that the strands (20) substantially lie in one plane, adjacent to each other, and the ends (201) of the strands extend, in the width direction (W) of the heating element (3), beyond the heating element (3), wherein the portions of the ends (201) of the strands extending beyond the heating element (3) overlap each other, and an electric joint is formed between the lateral faces of these overlapping strands (20).

EXAMPLE 2

A conductor joint (1) as defined in example 1, characterized in that the strands (20) of the copper conductor (2) extend, at the ends (201) of the strands, beyond the heating element (3) by a distance, this distance being more than 10 times greater than the strand diameter (d), preferably more than 30 times greater than the strand diameter (d).

EXAMPLE 3

A conductor joint (1) as defined in example 1, characterized in that the layered structure also comprises, on the side of the strands (20) of the copper conductor (2) facing away from the heating element (3) in the thickness direction (T), a strip (31) of the heating element (3) adapted to equalize the electric potential between the heating element (3) and the copper conductor (2) as well as to increase the conductive area between the heating element (3) and the copper conductor (2).

EXAMPLE 4

A conductor joint (1) as defined in example 1, characterized in that the strands (20) consist of a straight, unbraided and uninsulated copper wire.

EXAMPLE 5

A conductor joint (1) as defined in example 1, characterized in that the magnitude of the current transfer capacity is chosen to allow an electric power of dozens of kilowatts, such as 25 to 45 kW, through the conductor joint (1).

EXAMPLE 6

A conductor joint (1) as defined in examples 1 and 5, characterized in that the number of strands (20) needed is calculated by the following equation: $n=k*4*A/\pi d^2$ where A is the cross-sectional area of the copper conductor determined by how high a current transfer capacity is required.

EXAMPLE 7

A conductor joint component for making a conductor joint (1) according to example 1, characterized in that the strands (20) of the copper conductor (2) are removably fixed to an auxiliary substrate, such as adhesive tape, on which the strands (20) are disposed in a planar manner in such a way that the strands (20) substantially extend in one plane, adjacent to each other.

What is claimed is:

1. A system comprising: a fiber-structured heating element; a copper conductor; and a conductor joint therebetween, wherein dimensions of the fiber-structured heating element being length (L)>>width (W)>>thickness (T), and which heating element comprises carbon fiber strands, wherein the copper conductor is transversely disposed relative to a longitudinal direction (L) of the heating element to form a layered structure in a thickness direction (T), on both opposing sides of the heating element, the copper conductor comprising copper strands separable from each other, wherein the copper strands of the copper conductor, a number and a diameter of which are configured to transfer electric power of more than ten kW, are quantitatively evenly distributed on both opposing sides and corresponding surfaces of the heating element, having a material including carbon fiber strands of the heating element in between, so that on each of said both opposing sides the strands distributed thereto extend along and cover the width (W) of the heating element, the strands on each side of said both opposing sides being further disposed in a planar manner in such a way that the strands lie in one plane, adjacent to each other, and the ends of the strands further extend on each of said both opposing sides, in a width direction (W) of the heating element, beyond the heating element, wherein portions of the ends of the strands extending beyond the heating element overlap each other, and an electric joint is formed between lateral faces of these portions of overlapping strands.

2. The system as defined in claim 1, wherein the strands of the copper conductor extend, at the ends of the strands, beyond the heating element by a distance, this distance being more than 10 times greater than the strand diameter (d).

3. The system as defined in claim 1, wherein the layered structure also comprises, on the both opposing sides of the strands of the copper conductor facing away from the heating element in the thickness direction (T), a strip of the heating element adapted to equalize the electric potential between the heating element and the copper conductor as well as to increase the conductive area between the heating element and the copper conductor.

4. The system as defined in claim 1, wherein the strands consist of a straight, unbraided and uninsulated copper wire.

5. The system as defined in claim 1, wherein the magnitude of the current transfer capacity is chosen to allow an electric power of dozens of kilowatts through the conductor joint.

6. The system of claim 5, wherein the number of strands needed is calculated by the following equation: $n=k*4*A/\pi d^2$ where A is the cross-sectional area of the copper conductor determined by how high a current transfer capacity is required, n is the number of strands, k is the strand number constant and d is a diameter of one strand.

7. The system of claim 1, wherein the number of copper strands needed is calculated by the following equation: $n=k*4*A/\pi d^2$ where A is an cross-sectional area of the copper conductor determined by how high a current transfer capacity is required, n is the number of copper strands needed, k is the strand number constant and d is a diameter of one strand.

8. The system according to claim 1, wherein the strands of the copper conductor are removably fixed to an auxiliary substrate on which the strands are disposed in a planar manner in such a way that the strands extend in one plane, adjacent to each other.

9. The system according to claim 8, wherein the auxiliary substrate includes an adhesive tape on which the strands are disposed in a planar manner in such a way that the strands extend in one plane, adjacent to each other.

10. The system as defined in claim 1, wherein the magnitude of the current transfer capacity is chosen to allow an electric power of 25 to 45 kW through the conductor joint.

11. The system as defined in claim 1, wherein the strands of the copper conductor extend, at the ends of the strands, beyond the heating element by a distance, this distance being more than 30 times greater than the strand diameter (d).

* * * * *